(12) United States Patent
Kang

(10) Patent No.: US 8,443,186 B2
(45) Date of Patent: May 14, 2013

(54) METHOD AND DEVICE OF DATA ENCRYPTION

(75) Inventor: Kyung-don Kang, Seoul (KR)

(73) Assignee: NHN Corporation, Seongnam-si (KR)

( * ) Notice: Subject to any disclaimer, the term of this patent is extended or adjusted under 35 U.S.C. 154(b) by 2106 days.

(21) Appl. No.: 11/283,167

(22) Filed: Nov. 18, 2005

(65) Prior Publication Data

US 2006/0129801 A1 Jun. 15, 2006

Related U.S. Application Data

(63) Continuation of application No. PCT/KR2004/001175, filed on May 18, 2004.

(30) Foreign Application Priority Data

May 20, 2003 (KR) .......................... 10-2003-0032071

(51) Int. Cl.
*H04L 29/06* (2006.01)

(52) U.S. Cl.
USPC ............................................ 713/153; 726/26

(58) Field of Classification Search ................... 713/153, 713/181, 187, 189; 380/277, 281; 726/26
See application file for complete search history.

(56) References Cited

U.S. PATENT DOCUMENTS

| | | | |
|---|---|---|---|
| 5,799,089 A | 8/1998 | Kühn et al. | |
| 5,838,795 A | 11/1998 | Mittenthal | |
| 6,055,316 A | 4/2000 | Perlman et al. | |
| 2001/0010722 A1* | 8/2001 | Enari | 380/277 |
| 2002/0118886 A1* | 8/2002 | Hwang et al. | 382/250 |
| 2005/0169471 A1* | 8/2005 | Moldovyan et al. | 380/216 |

FOREIGN PATENT DOCUMENTS

| | | |
|---|---|---|
| EP | 1133099 A2 | 9/2001 |
| JP | 2002-341759 | 11/2002 |
| KR | 2001-101753 | 11/2004 |
| WO | WO 0239654 A1 | 5/2002 |

* cited by examiner

*Primary Examiner* — Farid Homayounmehr
*Assistant Examiner* — Suman Debnath
(74) *Attorney, Agent, or Firm* — H.C. Park & Associates, PLC

(57) ABSTRACT

An encryption method and apparatus thereof is disclosed. In one embodiment the method includes (a) receiving the content data via the network, (b) changing a sequence of the received content data according to a predetermined algorithm or randomly to store in a form of a cache file, (c) generating a decryption key including information of the changed sequence of the data, and (d) encrypting the decryption key according to a predetermined encryption system, wherein if a playback or transmission of the stored content is requested, the encrypted decryption key is decrypted and the corresponding data is extracted from the cache file according to the sequence information of the decryption key to be played back or transmitted. According to one embodiment of the invention, a user is unable to illegally use content data stored in his local client and content data stored in a local client can be quickly decrypted so as not to affect playback of the content data.

30 Claims, 11 Drawing Sheets

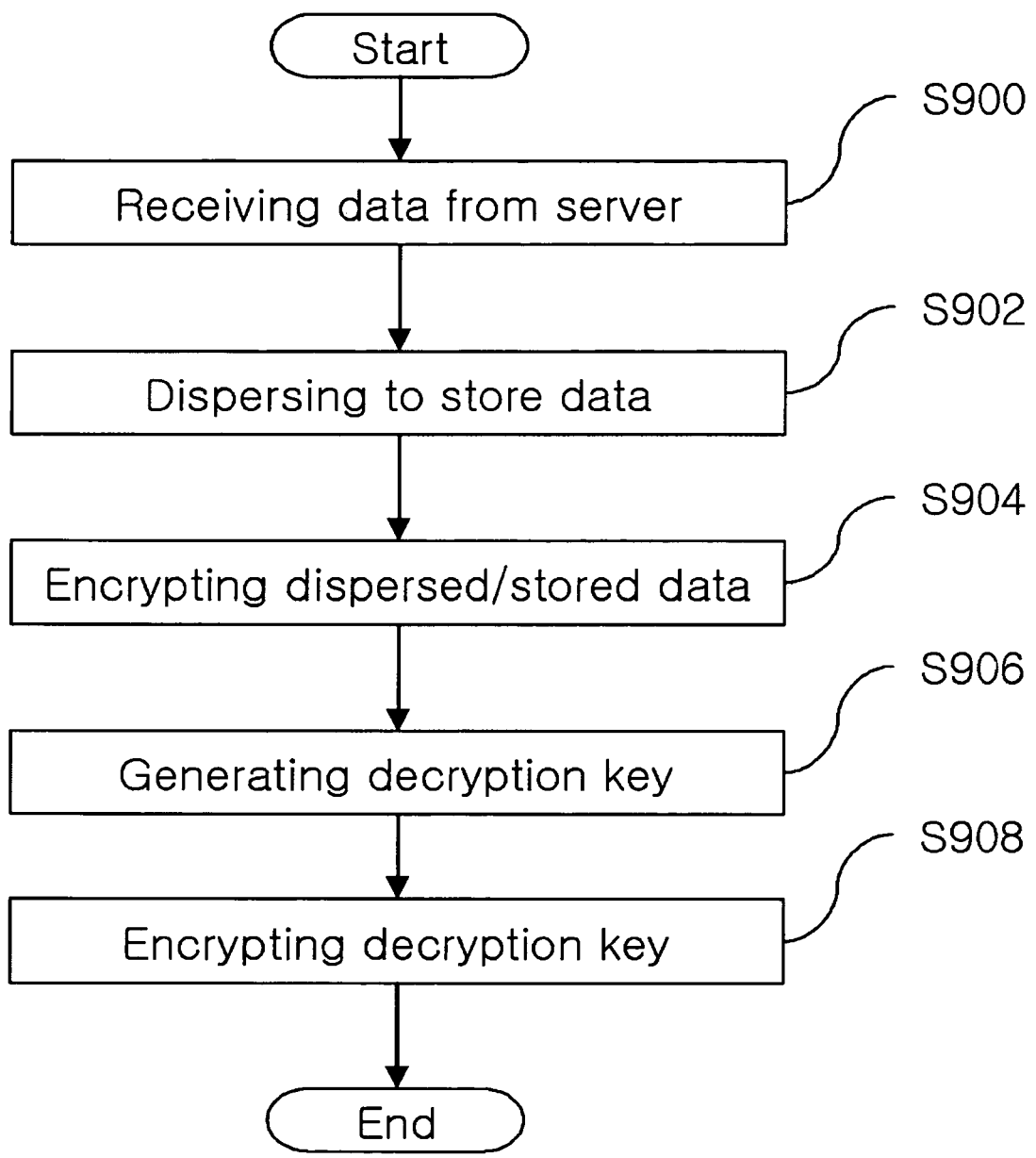

METHOD AND DEVICE OF DATA ENCRYPTION

RELATED APPLICATIONS

This application is a continuation application, and claims the benefit under 35 U.S.C. §§120 and 365 of PCT Application No. PCT/KR2004/001175, filed on May 18, 2004 and published on Dec. 2, 2004, in English; which is hereby incorporated by reference.

BACKGROUND OF THE INVENTION

1. Field of the Invention

The present invention relates to a data encryption method and apparatus thereof, and more particularly, to a data encryption method and apparatus thereof, which prevents a user from using received content data without authorization.

2. Description of the Related Technology

As the use of the Internet increases, the security of data communication on networks becomes more important. The Internet is advantageous since a user can easily obtain desired information. Yet, it is highly probable that data may be illegally circulated by an unauthorized distributor.

Hence, many efforts have been made in a data encryption method so as to enable only an authorized user to use content data. And, various kinds of encryption algorithm have been introduced.

Recently, services of providing moving picture data such as movies, animations, and the like via the Internet are increasing. And, such a content providing service is generally performed via a one-way transmission from a server to a local client.

Hence, the conventional content security is performed to mainly prevent a user from illegally accessing a server. However, as the content transmission technologies via the Internet become more diversified, content data, which has been downloaded from a server, may be stored in a client computer. In such a case, a user occasionally can use the stored data without such right. That is, even after an authorized period of time for rightful use expires, the user may access and use the stored data.

The moving picture data such as movie, animation, or the like has a large volume. Hence, if it generally takes a great deal of time to decrypt the encrypted data, practically it would be difficult to playback the data. Hence, an encryption method enabling to perform a quick decryption is needed to reduce the amount of time for playback of the data as well as to keep the reliance of the encryption.

SUMMARY OF CERTAIN INVENTIVE ASPECTS

One aspect of the present invention provides an encryption method and apparatus thereof that substantially obviate one or more of the disadvantages of the conventional art.

Another aspect of the present invention provides an encryption method and apparatus thereof, by which a user is unable to use content data stored in his computer without authorization.

Another aspect of the present invention provides an encryption method and apparatus thereof, by which content data stored in a local client can be quickly decrypted so as not to affect playback of the content data.

Another aspect of the present invention provides a method of encrypting content data received via a network. In one embodiment, the method includes (a) receiving the content data via the network, (b) changing a sequence of the received content data according to a predetermined algorithm or randomly to store in a form of a cache file, (c) generating a decryption key including information of the changed sequence of the data, and (d) encrypting the decryption key according to a predetermined encryption system, wherein if a playback or transmission of the stored content is requested, the encrypted decryption key is decrypted and the corresponding data is extracted from the cache file according to the sequence information of the decryption key to be played back or transmitted.

In one embodiment, the data received in (a) is previously dispersed and stored by a predetermined block unit.

In another embodiment, the data dispersed and stored by the block unit includes a plurality of sub-blocks, each of the sub-blocks includes a plurality of stripes, and in (b), a sequence of the stripes included in each of the sub-blocks is changed.

In another embodiment, the data dispersed and stored by the block unit includes a plurality of sub-blocks and in (b), a sequence of the sub-blocks is changed.

In another embodiment, the data is previously dispersed and stored by the predetermined block unit in a manner including deciding whether vacant slots exist in the cache file, if the vacant slots exist, selecting one of the vacant slots randomly to store a block in the selected slot, if the vacant slots fail to exist, searching a slot having an oldest access time of block data stored therein, and storing the block data in the searched slot.

In one embodiment, (d) includes selecting an encryption application point from the decryption key data, generating an encryption key corresponding to the selected application point, and encrypting a corresponding application point using the generated encryption key.

In one embodiment, the encryption key is a data encryption standard (DES) key and the encryption of the application point is performed by DES algorithm. More preferably, the encryption key is a Triple-DES key and the encryption of the application point is performed by Triple-DES algorithm.

In one embodiment, the selected application point is data for the information of the changed sequence among the decryption key data.

Another aspect of the present invention provides a system for encrypting content data received via a network. In one embodiment, the system includes i) content encrypting means for changing a sequence of the received content data according to a predetermined algorithm or randomly to store in a form of a cache file and ii) decryption key encrypting means for encrypting a decryption key for decrypting data encrypted by the content encrypting means according to a predetermined encryption system, wherein if a playback or transmission of the stored content is requested, the encrypted decryption key is decrypted and the corresponding data is extracted from the cache file according to the sequence information of the decryption key to be played back or transmitted.

Still another aspect of the present invention provides a computer readable medium storing a data encryption program installed in a client to encrypt content data received via a network. In one embodiment, the program includes i) a content encrypting module changing a sequence of the received content data according to a predetermined algorithm or randomly to store in a form of a cache file and ii) a decryption key encrypting module encrypting a decryption key for decrypting data encrypted by the content encrypting module according to a predetermined encryption system, wherein if a playback or transmission of the stored content is requested, the encrypted decryption key is decrypted and the corresponding data is extracted from the cache file according to the sequence information of the decryption key to be played back or transmitted.

Yet another aspect of the present invention provides a method of encrypting content data in a system including at least one server and a plurality of clients connected to the at least one server via a network, one of the clients receiving node information storing requested content data from the server to receive the content data from the server or another client, in encrypting content data stored in the client. In one embodiment, the method includes (a) storing the content data received from the server of the another client, (b) changing a sequence of the stored content data, (c) generating a decryption key including information of the changed sequence of the data, and (d) encrypting the decryption key according to a predetermined encryption system, wherein the sequence-changed content is stored in a form of a cache file, wherein if a playback or transmission of the sequence-changed content is requested, the encrypted decryption key is decrypted and the corresponding data is extracted from the cache file according to the sequence information of the decryption key to be played back or transmitted.

BRIEF DESCRIPTION OF THE DRAWINGS

FIG. 9 is a flowchart of an overall process of an encryption method according to one embodiment of the present invention;

DETAILED DESCRIPTION OF CERTAIN INVENTIVE EMBODIMENTS

Embodiments of the invention will be described with reference to the accompanying drawings.

Figure 1:
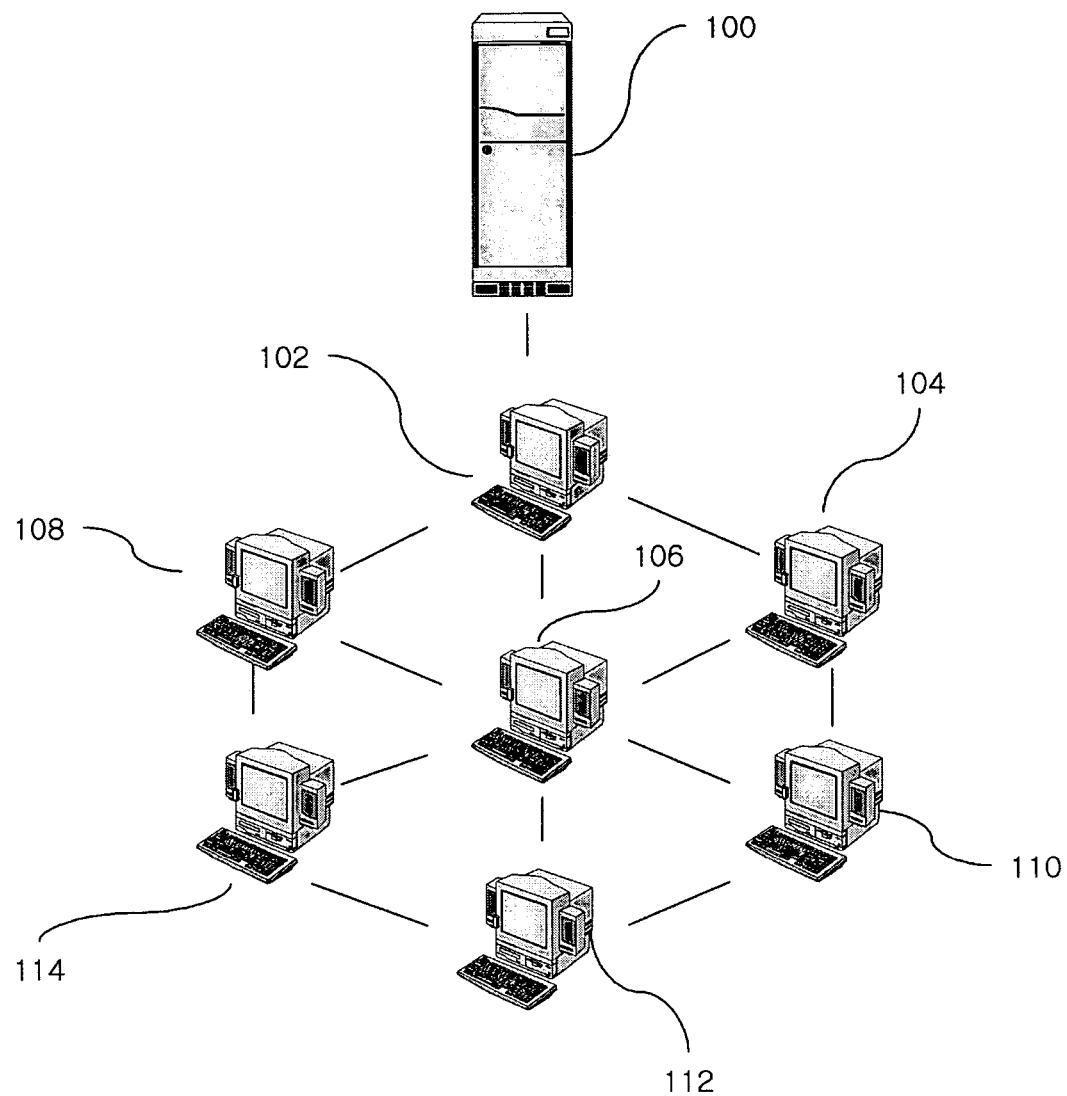
FIG. 1 is an exemplary diagram of a content data transmission network where a data encryption method according to one embodiment of the present invention is applied.

FIG. 1 is an exemplary diagram of a content data transmission network where a data encryption method according to one embodiment of the present invention is applied.

One embodiment of the present invention provides an encryption method to prevent a user from using content data stored in user's local client without authorization. In this case, the content data may include moving picture data such as a movie, animation, and the like, still picture data, and document text data such as a novel.

Generally, content data such as moving picture data is provided to user's local client from a server by real-time streaming. Hence, content data stored in a server is not stored in user's local client in general.

Yet, as mentioned in the foregoing description, content transmission technologies in Internet are diversified so that content data may be stored in user's local client in part or entirely.

Figure 2:
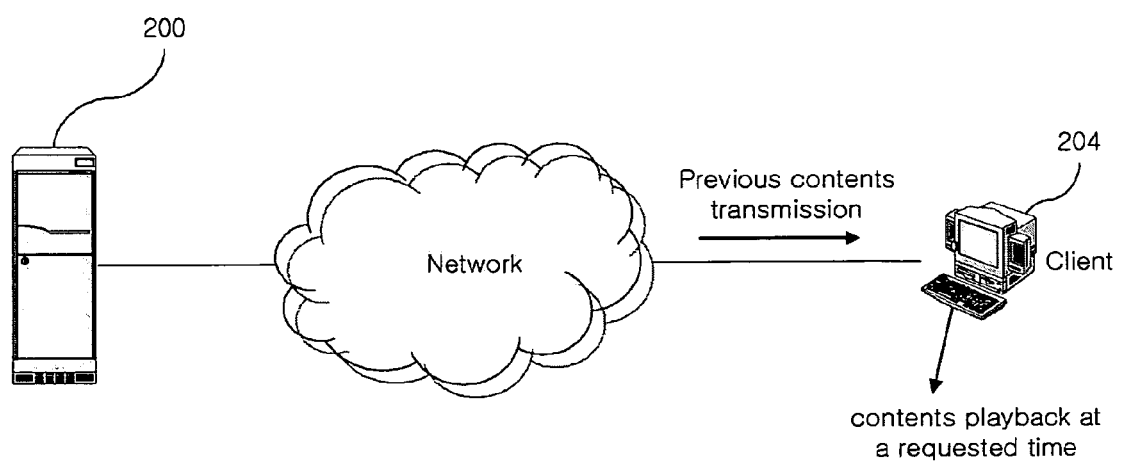
FIG. 2 is an exemplary diagram of another transmission system where a data encryption method according to another embodiment of the present invention is applied.

Examples of a content transmission system, in which content data of a server is stored in a user client, are shown in FIG. 1 and FIG. 2. An encryption method according to one embodiment of the present invention is applicable to such a content transmission system. The content transmission systems shown in FIG. 1 and FIG. 2 are just exemplary. In case that content data is stored in user's local client, an encryption method according to one embodiment of the present invention is applicable to any kind of system as well as to the system shown in FIG. 1 or FIG. 2.

Referring to FIG. 1, a system adopting an encryption method according to one embodiment of the present invention includes a plurality of user clients 102, 104, 106, 108, 110, 112, and 114 connected to a server 100 via a network.

The transmission system, as shown in FIG. 1, is applicable to overlay multicasting. The overlay multicasting is a technology that forwarding of multicast data is performed in an end host or server instead of a router.

When the same data are transferred to a plurality of user clients like Internet broadcasting, multicasting may be effective in use. Yet, in case of transmitting data by multicasting, a previous router should be replaced by a multicast router.

In replacing the previous router by the multicast router, it takes much time as well as high costs. Hence, the overlay multicasting is operative in enabling a user client or server to play a role as the multicast router.

In FIG. 1, it is assumed that the server 100 is transferring Internet broadcast data and that the first and second clients 102 and 104 are receiving the data transferred from the server 100.

In case of general unicasting instead of the overlay multicasting, the third client 106 intending to receive the broadcast data transferred from the server 100 directly needs to access the server 100 to receive the broadcast data.

Yet, in case of using the overlay multicasting, the third client 106 accesses the second client 104, thereby enabling the third client 106 to receive the broadcast data from the second client 104 that receives the broadcast data from the server 100. Namely, the third client 106 receives the broadcast data not from the server 100 directly but via the second client 104.

In case of adopting the unicasting, the entire clients access the server 100 to request data. Hence, heavy load is put on the server and the server 100 is unable to transfer data to a multitude of the clients.

Yet, in case of adopting the overlay multicasting, the client receives data and simultaneously plays a role as a server transferring the data to other clients. Hence, the server is free from load and the data can be transferred to a multitude of the clients.

In the overlay multicasting, an agent program is installed in each of the clients intending to request data. The agent program enables each of the clients intending to request the data to receive information of other clients receiving the data via the server 100 and to access the corresponding client to request the data.

By the agent program, the third client 106 recognizes that the second client 104 is receiving the broadcast data via the server 100 and then accesses the second client 104 to request the data.

Such an overlay multicast transmission network is applicable to a VOD (video on demand) system as well as real-time broadcast. The client receives address information of another client storing the corresponding multimedia content from the server 100 and then receives the corresponding multimedia content from another client instead of the server. Hence, it is unnecessary for the entire clients to receive the data from the server, whereby the load put on the server can be reduced.

Yet, in case of providing a VOD service via an overlay multicast system, a user client stores content data in the form of a cache file.

Thus, when the content data are stored in the client, a user performs filing on the content data stored in the client and may use it illegally. Hence, a content encryption method, which is used only in transferring content data stored in a client to another client and on which a user is unable to perform filing illegally, is requested. An encryption method according to one embodiment of the present invention is applicable to a transmission system of downloading data stored in another user client.

FIG. 2 is an exemplary diagram of another transmission system where a data encryption method according to one embodiment of the present invention is applied.

FIG. 2 shows a system as follows. First of all, a server 200 previously transfers content data to a user client 204. After having stored the transferred content data, the user client 204 plays back the stored content data whenever the user wants to. And, such a system provides a service named 'content reservation function' in general.

Even if data can be provided at relatively high speed since the server 200 secures a relatively wide bandwidth, it may happen that the data is unable to be received at the transfer rate of the server due to a poor network environment between the server and client. For instance, in case that a network link connected to a client supports up to 1 Mbps when a server transfers data at 2 Mbps, the client is unable to be provided with moving picture data of high resolution provided from the server.

Otherwise, in case of intending to play back content data, which was previously downloaded while a user was doing something else, the transport system shown in FIG. 2 is applicable thereto.

When the data downloaded via content reservation is to be played back, the transferred content should be stored in the user client. Hence, a user may perform filing on the downloaded content to use illegally as well in case of the content reservation. Hence, the encryption method according to one embodiment of the present invention is applicable thereto.

Although a basic model of a transmission system enabling content reservation is illustrated in FIG. 2, it is apparent to those skilled in the art that the content reservation function is applicable to other content transmission systems including an overlay multicasting system in FIG. 1 and the like.

Figure 3:
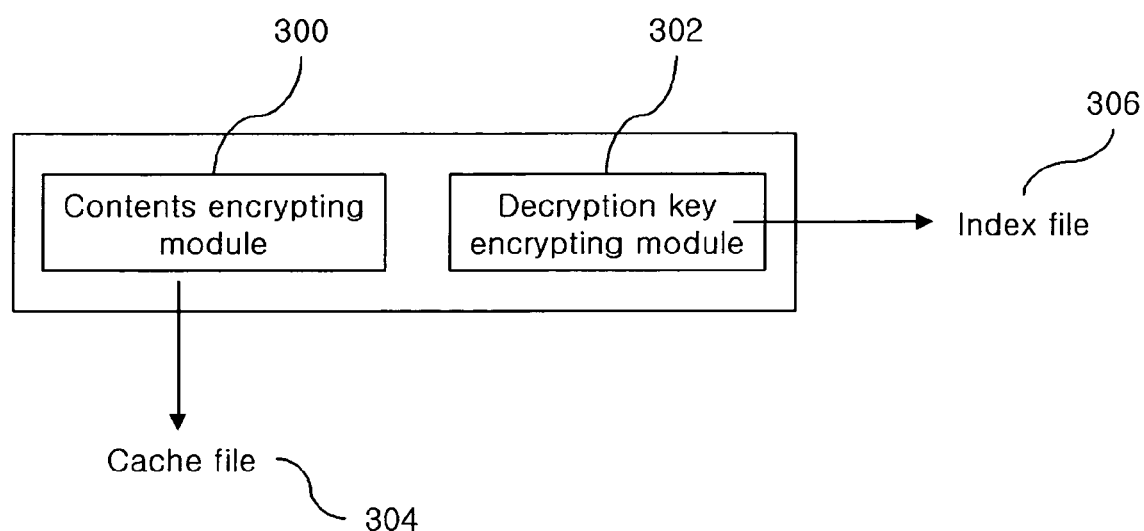
FIG. 3 is a block diagram of a module structure of an encryption program according to one embodiment of the present invention.

FIG. 3 is a block diagram of a module structure of an encryption program according to one embodiment of the present invention.

An encryption method according to one embodiment of the present invention can be implemented via a general computer program. Yet, the encryption method according to one embodiment of the present invention is not limited to the implementation via program. But, it is apparent to those skilled in the art that the encryption method according to one embodiment of the present invention can be implemented in the form of a separate chip, card, or the like.

Referring to FIG. 3, an encryption program according to one embodiment of the present invention may include a content encrypting module 300 and a decryption-key encrypting module 302.

The content encrypting module 300 encrypts content data received from a server or another client.

In case that the content are multimedia content, the encrypted data are decrypted to be played back. Hence, if it takes a quite a long time for decryption, content playback may be affected.

In accordance with one embodiment of the present invention, the content encrypting module preferably encrypts the content data in a manner that no time delay for decrypting the content data almost occurs.

General encryption algorithm according to a related technology needs a significant amount of decryption time, thus, one embodiment of the invention does not use such a conventional encryption algorithm.

Hence, in one embodiment, the content encrypting module performs encryption in a manner of changing a sequence of content data. In case of changing sequence of the content data, it is able to perform decryption without a time delay since the decryption is enabled by recognizing the changed sequence information only without decrypting the encrypted data via a specific decryption function.

The content data of which sequence is changed by the content encrypting module is stored in a cache file 304.

Moreover, the content encrypting module generates a decryption key including information of the changed sequence.

Meanwhile, the decryption-key encrypting module 302 is operative in encrypting again the decryption key of the data encrypted by the content encrypting module 300 according to a predetermined encryption algorithm. The content encrypting module performs encryption in a manner of changing the sequence information of the data only, whereby its reliance of security may not be better than that of other encryption algorithm. Yet, a decryption time should avoid affecting the playback of the content data, whereby it is unable to use an encryption algorithm having higher reliance of security in encrypting the content data.

Accordingly, the decryption-key encrypting module 302 encrypts decryption-key data, of which decryption time is short due to small capacity, again. The decryption-key encrypting module 302 can encrypt the decryption key using a general encryption algorithm.

The decryption-key encrypting module 302 according to one embodiment of the present invention may encrypt the decryption key using a symmetric-key encrypting system.

The symmetric-key encrypting system is a system that a sender or recipient performs encryption and decryption processes using the same key. As a symmetric-key encrypting system, there are American DES (data encryption standard), Triple-DES, European IDEA (international data encryption algorithm), Japanese FEAL (fast data encryption algorithm), etc.

In accordance with another embodiment of the present invention, a public-key encrypting system is also applicable to the encryption of the decryption key.

The public-key encrypting system differs in encryption and decryption keys. Even if one of the encryption and decryption keys in the public-key encrypting system is known, it is difficult to know the other. In the public-key encrypting system, a pair of keys are generated via a key generation algorithm, one is opened to the public, and the other is kept as a secret key to use.

As a public-key encrypting system, there are RSA encryptions using difficulty of factorization, Rabin encryption, Merkle-Hellman Knapsack encryption, Graham-Shamor encryption, McEliece encryption using difficulty in decrypting a linear error correction sign, elliptic curve encryption system, etc.

The decryption key encrypted by the decryption-key encrypting module 302 is stored in the form of index file 306.

Figure 4:
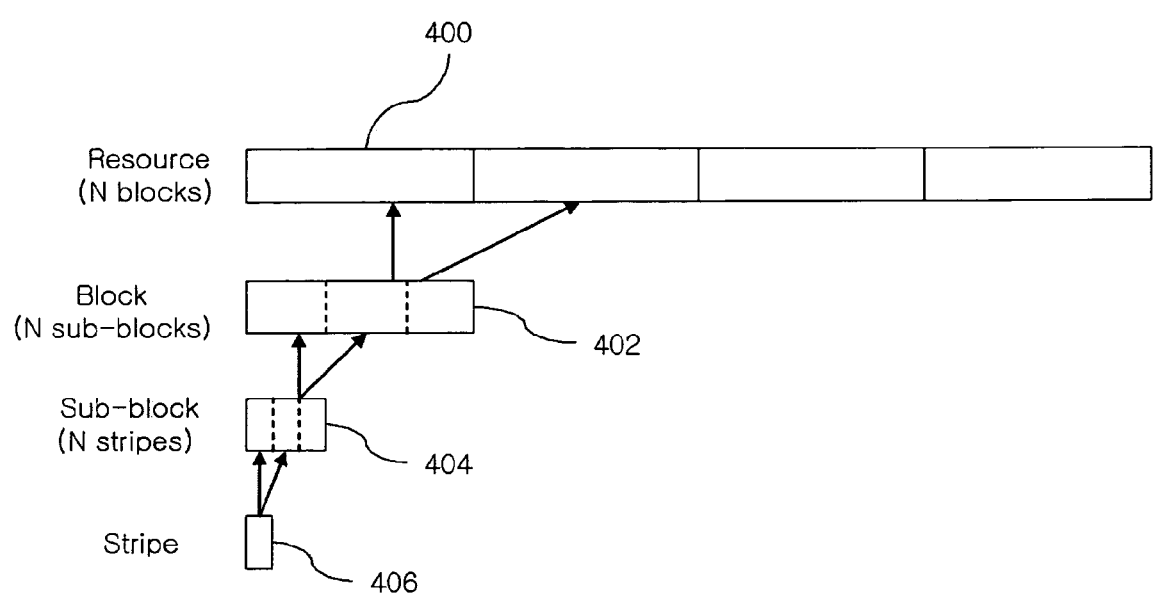
FIG. 4 is a diagram of showing units of content data according to one embodiment of the present invention.

FIG. 4 is a diagram of showing units of content data according to one embodiment of the present invention.

Referring to FIG. 4, content data in an encryption method according to one embodiment of the present invention can be divided into a resource 400, a block 402, a sub-block 404, and a stripe 406, in turn.

Each of the resource 400, block 402, sub-block 404, and stripe 406 in FIG. 4 is a name for unit of storing or encrypting data for convenience of distinction. And, it is apparent to those skilled in the art that units of the content data can be divided in a manner different from that shown in FIG. 4.

The resource 400 in FIG. 4 is overall data for one content. The resource 400, as shown in FIG. 4, includes a plurality of blocks 402. In accordance with one embodiment of the present invention, the block may consist of 16 Mbytes.

The block 402 includes a plurality of sub-blocks 404. In accordance with one embodiment of the present invention, the sub-block may consist of 1 Mbytes, In this case, the block 402 includes sixteen sub-blocks 404.

The sub-block 404 includes a plurality of stripes 406. In accordance with one embodiment of the present invention, the stripe may consist of 32 Kbytes. In this case, the sub-block 404 includes thirty-two stripes.

Figure 5:
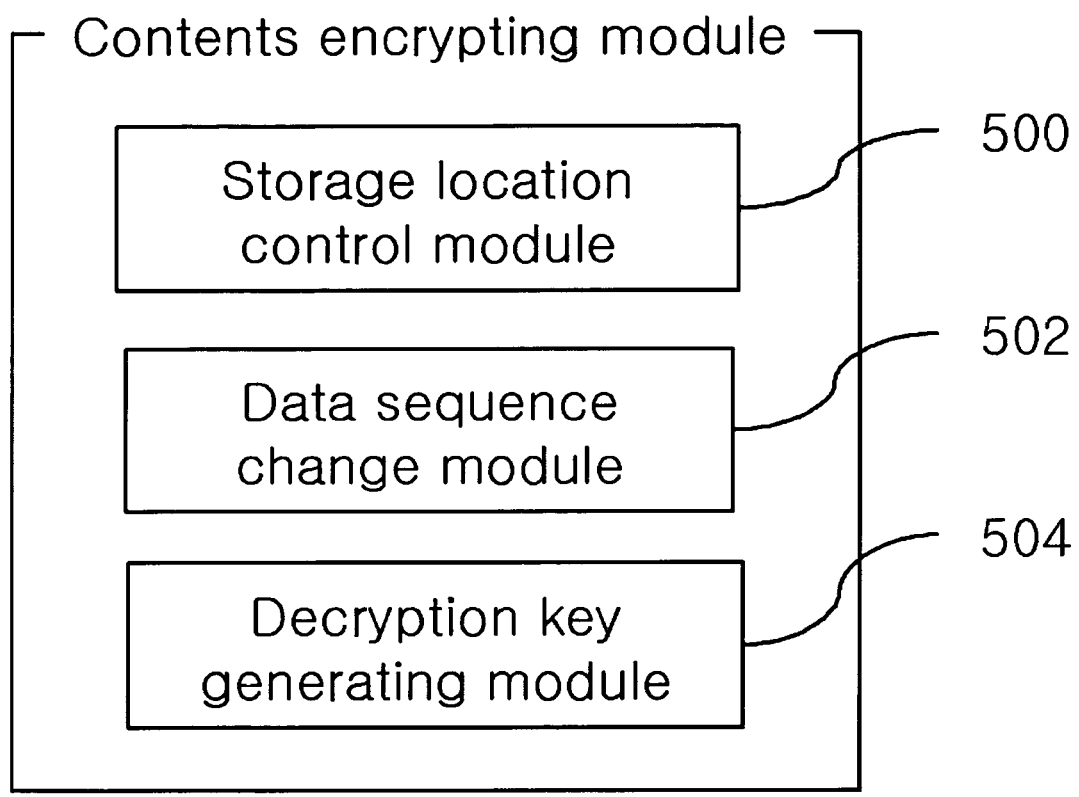
FIG. 5 is a block diagram of a content encrypting module according to one embodiment of the present invention.

FIG. 5 is a block diagram of a content encrypting module according to one embodiment of the present invention.

Referring to FIG. 5, a content encrypting module according to one embodiment of the present invention includes a storage location control module 500, a data sequence change module 502, and a decryption-key generating module 504.

The storage location control module 500 is to control a location where content data is stored. In accordance with one embodiment of the present invention, the content data is stored in a cache file by block unit. In doing so, the storage location control module 500 controls a storage location of block data so that the content data is stored in a random location instead of a sequential location.

Namely, the content encrypting module primarily disperses to store the content data by the block unit by the storage location control module 500, thereby preventing a user from performing filing on the content data. A detailed method of dispersing the storage location of block will be explained by referring to the attached drawings later.

The data sequence change module 502 changes a sequence of stripes included in a sub-block. For instance, in case that $1^{st}$ to $32^{nd}$ stripes are sequentially included in a sub-block while not being encrypted, the data sequence change module 502 randomly changes a sequence of the sequentially arranged stripes.

Figure 6:
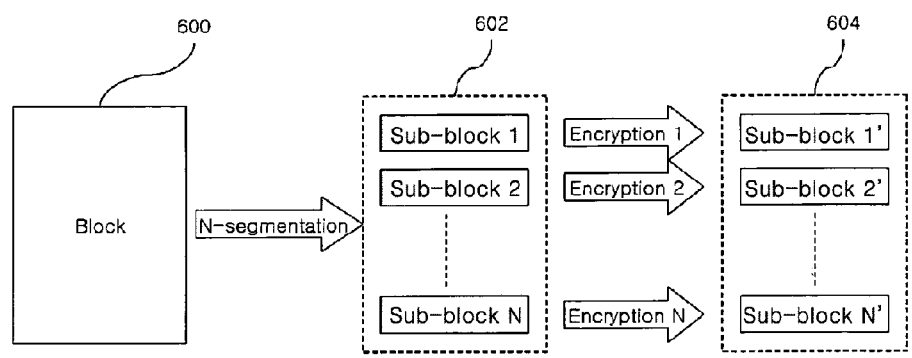
FIG. 6 is an exemplary diagram showing that a data sequence change module changes a stripe sequence stripe to vary an attribute of each sub-block.

FIG. 6 is an exemplary diagram showing that a data sequence change module 502 changes a stripe sequence to vary an attribute of each sub-block.

Referring to FIG. 6, a block 600 includes a plurality of blocks 602, and a plurality of stripes is sequentially arranged in each of the blocks 602. The data sequence change module changes a sequence of the stripes, by which an attribute of a block 1 is transformed into a block 1'.

Encryption can be achieved in a manner of changing a sequence of the sub-blocks instead of changing the sequence of the stripes included in each of the sub-blocks in FIG. 6.

The decryption-key generating module 504 records the changed sequence information in a decryption key so that the sequence information changed by the data sequence change module 502 can be decrypted later.

And, the decryption-key generating module 504 enables to record location information of the dispersed and stored block. If the sequence of the data stored in the cache file is equal to that of the data recorded in the decryption key, it will be unnecessary for the decryption-key generating module 504 to record the information of the storage location in a separate field.

Figure 7:
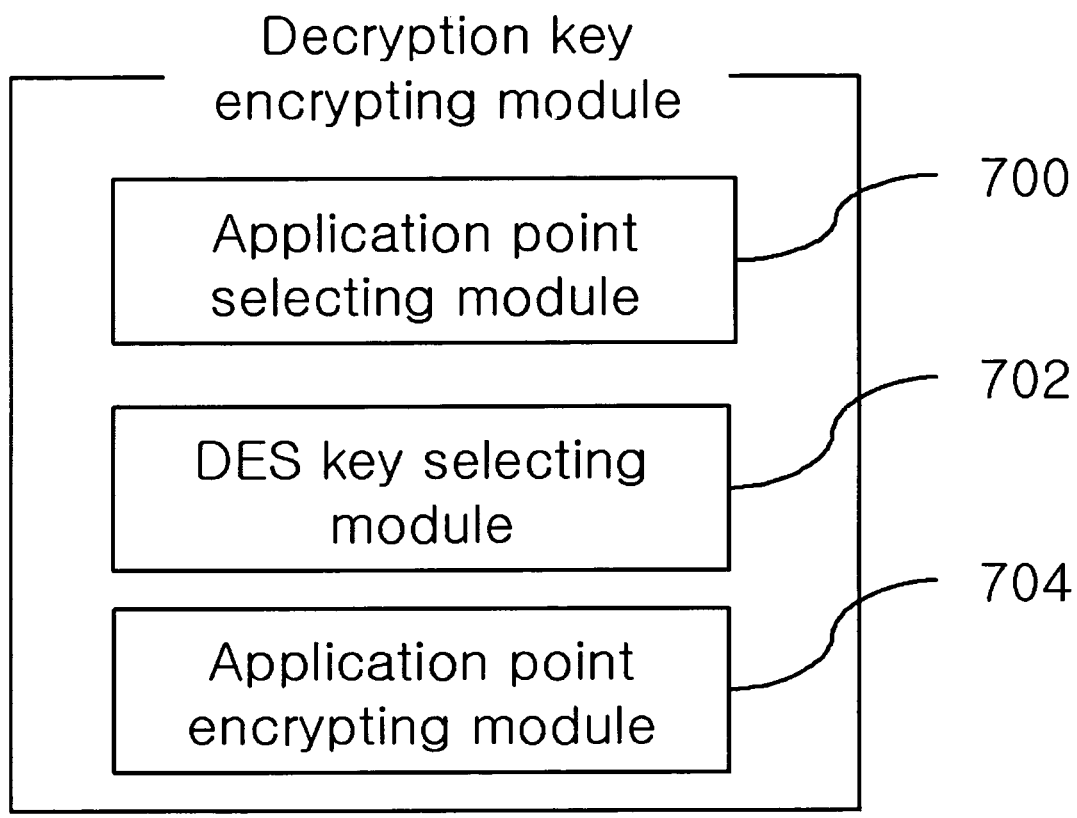
FIG. 7 is a block diagram of a decryption-key encrypting module according to one embodiment of the present invention.

FIG. 7 is a block diagram of a decryption-key encrypting module according to one embodiment of the present invention.

Referring to FIG. 7, a decryption-key encrypting module according to one embodiment of the present invention includes an application point selecting module 700, a DES key selecting module 702, and an application point encrypting module 704.

FIG. 7 shows a module in case of encrypting a decryption key using the DES or Triple-DES system. As mentioned in the foregoing description, various encryption algorithms can be used in the decryption-key encryption.

The application point selecting module 700 selects application points for performing DES encryption thereon. In one embodiment, encryption is performed on partially selected application points instead of the entire decryption key to minimize a time taken for decryption. The application point selecting module 700 selects partial application points on which the encryption will be performed among the entire decryption key data. For instance, if the decryption key includes a total of M bytes and N selectable application points, the application point selecting module selects N application points of the M bytes.

The application point selecting module 700 enables to randomly select application points, on which decryption will be performed, from the entire decryption key data. In accordance with another embodiment of the present invention, the application point selecting module 700 may previously select application points by a predetermined selection algorithm.

In case of selecting application points randomly, the selected application point information needs to be managed as separate index information. In case of selecting application points by the predetermined selection algorithm, the selected application point information needs not to be managed as separate index information only if the number of application points is known.

Data for data sequence change information is the most important one among the entire decryption key data, whereby the selected application points are preferably data for the sequence change information among the decryption key data.

The DES key selecting module 702 selects a DES key for the respective selected application points. In accordance with one embodiment of the present invention, the DES key for the respective application points can be randomly selected. In accordance with another embodiment of the present invention, DES-key selection algorithm for each application point may be previously configured.

In case of selecting the DES key randomly, application points and DES key information corresponding to the application points need to be managed as a separate index file. Yet, in case of selecting the DES key for the application point via the previously configured selection algorithm, the DES key information corresponding to the application point needs not to be managed as an index file.

The application point encrypting module 704 performs encryption on the selected application point with the corresponding DES key. If N application points are selected, encryption is performed total N-times. The DES encryption system is already opened to the public and its detailed explanation will be skipped in the following description.

Figure 8A:
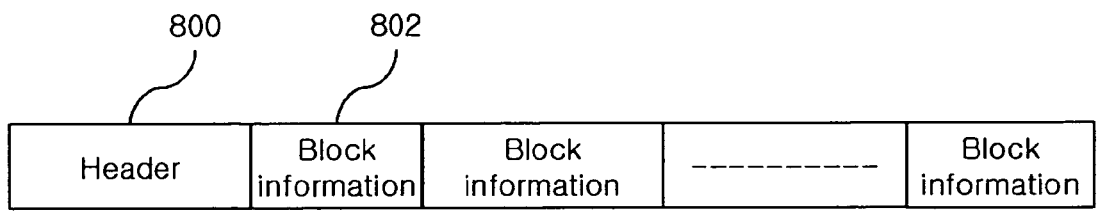
FIG. 8a is a diagram of a field structure of a decryption key according to one embodiment of the present invention.

FIG. 8*a* is a diagram of a field structure of a decryption key according to one embodiment of the present invention.

Referring to FIG. 8*a*, a decryption key according to one embodiment of the present invention includes a header field 800 and a plurality of block information fields 802. As content data are stored in a cache file by block unit information in the decryption key is also stored by block unit.

Figure 8B:
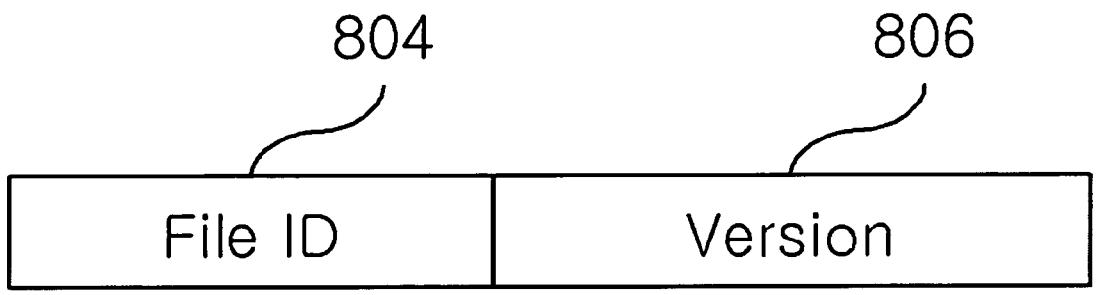
FIG. 8b is a diagram of a header field structure of a decryption key according to one embodiment of the present invention.

FIG. 8*b* is a diagram of a header field structure of a decryption key according to one embodiment of the present invention.

Referring to FIG. 8*b*, a header includes a file Id field 804 and a version field 806.

In case that there are a plurality of decryption key files, the file ID field needs information to identify the decryption file keys, and the version information of the decryption key is recorded in the version field 806.

Figure 8C:
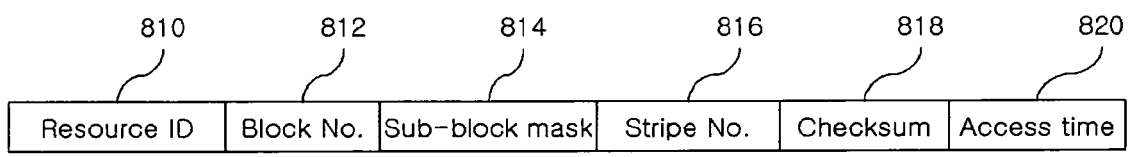
FIG. 8c is a diagram of a block information field structure of a decryption key according to one embodiment of the present invention.

FIG. 8*c* is a diagram of a block information field structure of a decryption key according to one embodiment of the present invention.

Referring to FIG. 8*c*, a block information field structure of a decryption key according to one embodiment of the present invention includes a resource ID information 810, a block number information 812, a sub-block mask information 814, a stripe number information 816, a checksum information 818, and an access time information 820.

The resource ID information 810 means a unique ID of a resource (content) including a block therein. For instance, if the content is the movie "Gone with the Wind," the unique ID information indicating the corresponding movie will be recorded as the resource ID information.

Number information of each block is recorded in the block number 812, and information of whether a sub-block includes stripes therein is recorded in the sub-block mask 814. For instance, if there exists no stripe, '0' is recorded. If there exist stripes, '1' is recorded.

The checksum information 818 is the data to decide whether stripe data is valid or not. And, time information of final access to the corresponding block lately is recorded in the access time 820.

Figure 8D:
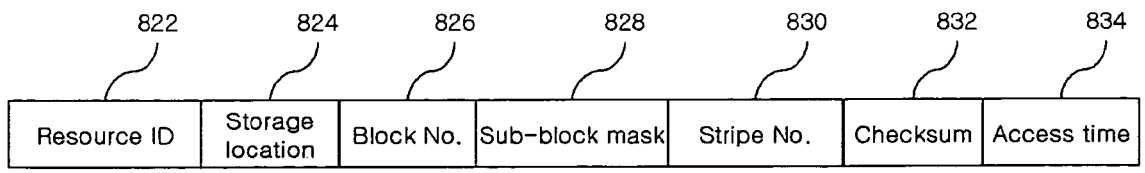
FIG. 8d is a diagram of a block information field structure of a decryption key according to another embodiment of the present invention.

FIG. 8*d* is a diagram of a block information field structure of a decryption key according to another embodiment of the present invention, in which a block of cache file and a block of decryption key are recorded in the same sequence. As the block of cache file and the block of decryption key are recorded in the same sequence, information of storage location of the block is not included in the block information.

Yet, information of a storage location 824, as shown in FIG. 8*d*, can be included in block information.

FIG. 9 is a flowchart of an overall process of an encryption method according to one embodiment of the present invention.

Referring to FIG. 9, a client receives content data from a server (S900). In accordance with one embodiment of the present invention, the client enables to receive the data by stripe unit.

Instead of storing the received content data sequentially, the client disperses the data to store it in a cache file (S902). As mentioned in the foregoing description, the client can store the data by the block unit or by another data unit.

The dispersed and stored data is encrypted in a manner of changing its sequence (S904). As mentioned in the foregoing description, encryption can be performed in a manner of changing the sequence of the stripes included in the sub-block or the sequence of the sub-blocks themselves.

While the encryption progresses in a manner of changing the sequence of data, a decryption key including the changed sequence information is generated to decrypt the encrypted data (S906).

After completion of the sequence-changing encryption, an encrypting process for the decryption key is carried out (S908).

As mentioned in the foregoing description, various encryption algorithms can be utilized for the encryption of the decryption key.

Figure 10:
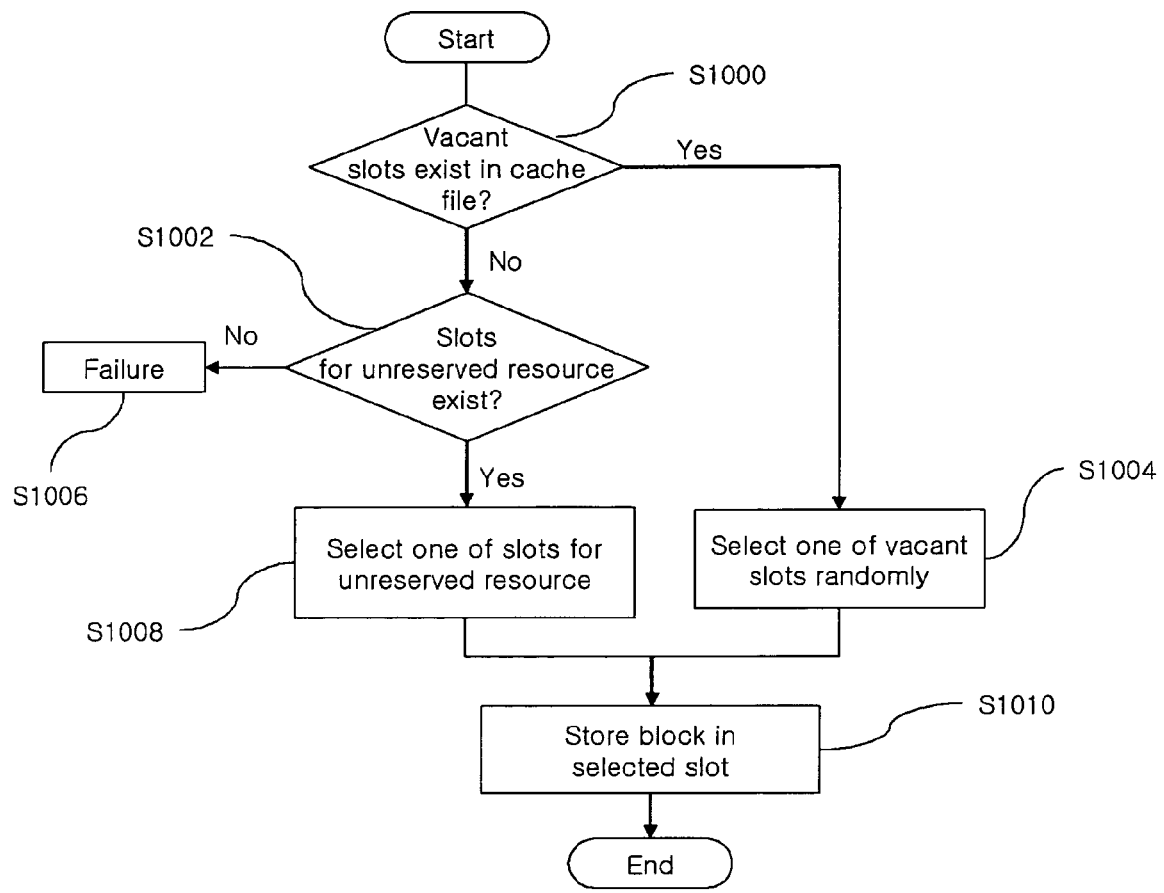
FIG. 10 is an exemplary flowchart of dispersing to store content data according to one embodiment of the present invention.

FIG. 10 is an exemplary flowchart of dispersing to store content data according to one embodiment of the present invention.

Referring to FIG. 10, it is preferentially decided whether vacant slots to store a block therein exist in a cache file (S1000).

If the vacant slots exist in the cache file, one of them is randomly selected and the corresponding block is stored in the selected slot (S1004).

If the vacant slots fail to exist in the cache file, it is decided whether slots for an unreserved resource exist (S1002). In this case, the reserved resource means a resource failing to be played back yet despite previously being downloaded by a user's request of reservation.

If the slots for the unreserved resource exist, one of the existing slots is selected (S1008). In accordance with one embodiment of the present invention, the slot having the oldest access time of the block is selected from the slots storing unreserved blocks. In accordance with another embodiment of the present invention, one of the existing slots can be randomly selected.

Once the corresponding slot is selected in the step S1008 or S1004, the corresponding block is stored in the selected slot (S1010).

The content dispersing/storing process in case of supporting a reservation function is explained in FIG. 10. Yet, in case of failing to support the reservation function, the step (S1002) of deciding the presence or non-presence of the slot for the unreserved resource can be omitted.

Moreover, it is also able not to select the slot for a reserved resource by setting an access time of the reserved resource to a latest time.

Figure 11:
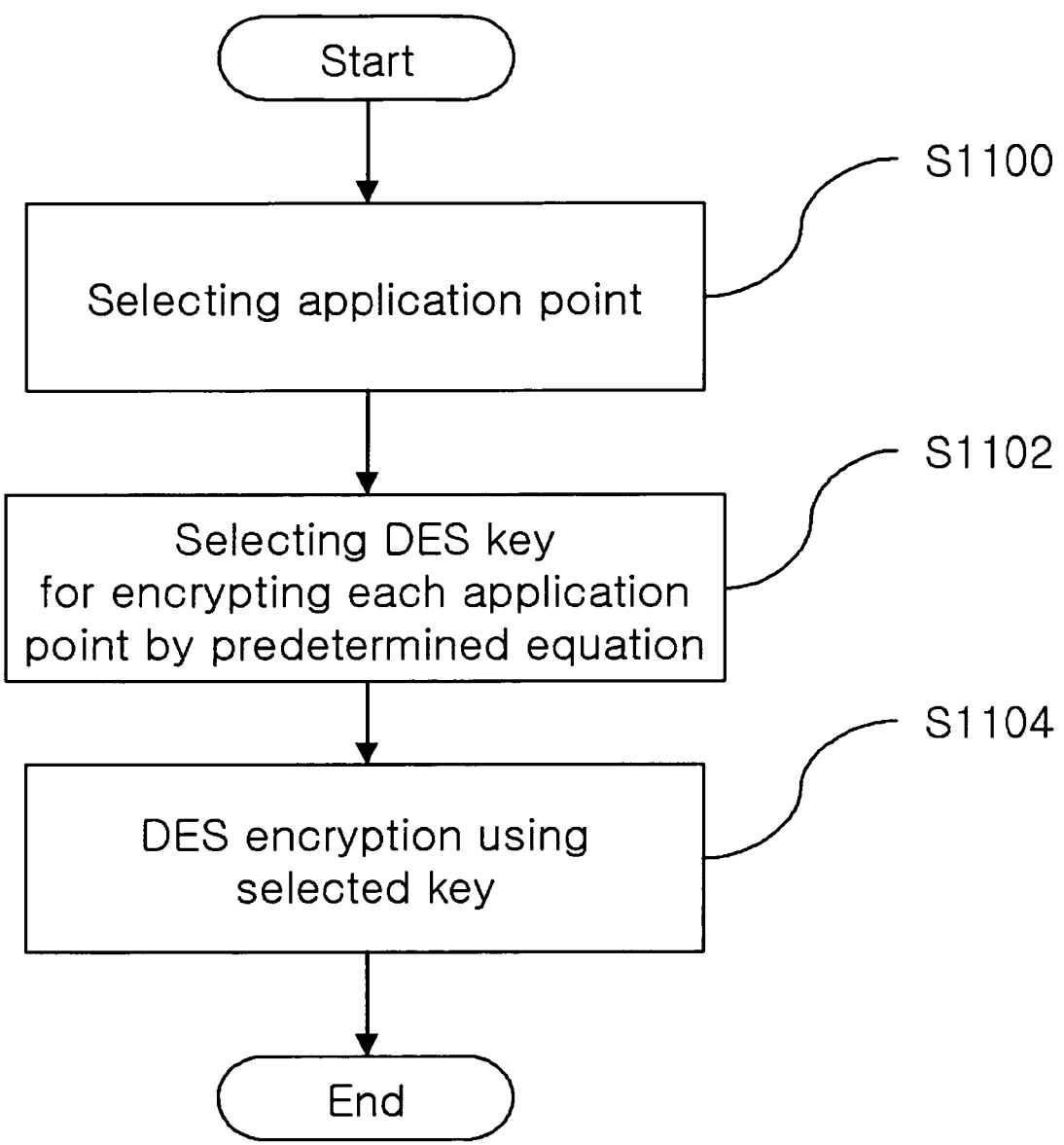
FIG. 11 is a flowchart of a decryption-key encrypting method according to one embodiment of the present invention.

FIG. 11 is a flowchart of a decryption key encrypting method according to one embodiment of the present invention.

FIG. 11 shows a decryption-key encrypting process in case of using Triple-DES system for decryption-key encryption. As mentioned in the foregoing description, in the decryption-key encryption, various encryption algorithms can be used for the decryption-key encryption as well as Triple-DES.

Referring to FIG. 11, an application point for applying DES encryption thereto is selected (S1100). In accordance with one embodiment of the present invention, a DES application point is selected according to a predetermined pattern.

In accordance with another embodiment of the present invention, a DES application point can be randomly selected as well. In case of selecting the DES application point randomly, application point selection information should be stored in a separate index file. Hence, the DES application point is more preferably selected according to the predetermined pattern. As mentioned in the foregoing description, the selected DES application point is preferably data for the sequence information among the decryption key data.

After completion of selecting the application point, a DES key for encrypting each application point according to a predetermined algorithm is selected (S1102). In Triple-DES, three encryption keys are used. In this case, the three keys are preferably selected to be uniform. In accordance with one embodiment of the present invention, a remainder found by dividing $n^2/13$ by 4 can be used as a DES key selecting equation, where n is a number of application points.

Once the DES key corresponding to each application point is selected, the application points are encrypted by the corresponding DES keys, respectively (S1104).

One embodiment of the present invention provides the data encryption method and apparatus thereof, by which the content data stored in the user's local client can be effectively prevented from being illegally used by the user.

Moreover, the encryption method according to one embodiment of the present invention enables to perform the decryption in a short time, thereby having no influence on playback of the data even if the data are encrypted.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of encrypting content data received via a network, the method comprising:
   receiving, at a user terminal, content data comprising a plurality of blocks via the network;
   changing a sequence of the blocks of the received content data to store the changed sequence of the blocks of the content data in a memory of the user terminal;
   selecting a portion of the changed sequence of the blocks, the selected portion corresponding to decryption key data;
   generating a decryption key according to the selected portion which corresponds to the changed sequence of the content data; and
   encrypting the decryption key,
   wherein, in response to receipt of a signal of a playback request or a transmission request of the stored content data transmitted from one or more of user terminals, the encrypted decryption key is decrypted, and the corresponding content data is extracted from the memory according to the selected portion of the changed sequence of the blocks to be reproduced.

2. The method of claim 1, wherein the received content data is randomly stored in the memory by a block unit.

3. The method of claim 2, wherein the block unit comprises a plurality of sub-blocks, each of the sub-blocks comprises a plurality of stripes, and a sequence of the stripes included in each of the sub-blocks is changed.

4. The method of claim 2, wherein the block unit comprises a plurality of sub-blocks, and a sequence of the sub-blocks is changed.

5. The method of claim 1, wherein the decryption key is encrypted by one of a symmetric key encryption system and a public key encryption system.

6. The method of claim 1, further comprising:
   determining whether vacant slots exist in the memory;
   if vacant slots exist, selecting one of the vacant slots randomly to store a block in the selected slot;
   if one vacant slot exists, selecting the vacant slot to store a block in the selected slot;
   if vacant slots fail to exist, selecting a slot having an oldest access time of block data stored therein; and
   storing the block data in the selected slot.

7. The method of claim 1, wherein encrypting further comprises:
   selecting an encryption application point from the decryption key data;
   generating an encryption key corresponding to the selected encryption application point; and
   encrypting a corresponding encryption application point using the generated encryption key.

8. The method of claim 7, wherein the encryption application point is randomly selected according to the decryption key data.

9. The method of claim 7, wherein the encryption application point is randomly selected according to an algorithm according to the decryption key data.

10. The method of claim 7, wherein the encryption key corresponding to the encryption application point is randomly generated.

11. The method of claim 7, wherein the encryption key corresponding to the encryption application point is generated according to a selection algorithm to correspond to an encryption application point number.

12. The method of claim 7, wherein the encryption key is a data encryption standard (DES) key, and the encryption of the encryption application point is performed by a DES algorithm.

13. The method of claim 7, wherein the encryption key is a Triple-DES key, and the encryption of the encryption application point is performed by a Triple-DES algorithm.

14. The method of claim 7, wherein the selected encryption application point is data for the information of the changed sequence among the decryption key data.

15. An apparatus comprising a processor for encrypting content data received via a network, the network comprising plurality of client devices, the apparatus comprising:
   a receiver unit to receive a content data stream comprising a plurality of blocks via the network;
   a content encrypting portion executable by the processor configured to change a sequence of the blocks of the received content data to store the changed sequence of the content data in a storage medium, wherein a portion of the changed sequence of the blocks corresponding to decryption key data is selected for an encryption;
   a decryption key generating portion configured to generate a decryption key corresponding to the selected portion of the changed sequence of the content data; and
   a decryption key encrypting portion configured to encrypt the decryption key,
   wherein, in response to receipt of a signal of a playback request or a transmission request of the stored content data transmitted from one or more of the client devices, the encrypted decryption key is decrypted, and the corresponding content data is extracted from the memory according to the selected portion of the changed sequence of the blocks to be reproduced.

16. The apparatus of claim 15, wherein the content encrypting portion further comprises:
   a storage location control section configured to randomly store the content data by a block unit; and
   a data sequence change section configured to change a sequence of the stored block data.

17. The apparatus of claim 16, wherein the block unit comprises a plurality of sub-blocks, each of the sub-blocks comprises a plurality of stripes, and the data sequence change section is configured to change a sequence of the stripes.

18. The apparatus of claim 16, wherein the block unit comprises a plurality of sub-blocks, and the data sequence change section is configured to change a sequence of the sub-blocks.

19. The apparatus of claim 15, wherein the decryption key encrypting portion further comprises:
   an encryption application point selecting section configured to select an encryption application point from the decryption key data;
   an encryption key generating section configured to generate an encryption key corresponding to the selected encryption application point; and
   an encryption application point encrypting section configured to encrypt a corresponding encryption application point using the generated encryption key.

20. The method of claim 19, wherein the encryption application point comprises data for the changed sequence information of decryption key data.

21. A non-transitory computer-readable storage medium comprising an executable program, which when executed, performs encrypting content data received via a network using the following steps:
   changing a sequence of data blocks of the received content data according to an algorithm or randomly to store the changed sequence of the data blocks of the content data in a memory of a client device;
   selecting a portion from the changed sequence of the data blocks, the selected portion corresponding to decryption key data;
   generating a decryption key according to the selected portion which corresponds to the changed sequence of the content data; and
   encrypting the decryption key,
   wherein in response to receipt of a signal of a playback request or a transmission request of the stored content data transmitted from one or more of client devices via the network, the encrypted decryption key is decrypted, and the corresponding data is extracted from the memory according to the selected portion of the changed sequence information of the data blocks to be reproduced or transmitted to another client device.

22. The non-transitory computer-readable storage medium of claim 21, wherein each data block comprises a plurality of sub-blocks, each of the sub-blocks comprises a plurality of stripes, and the sequence of the stripes included in the sub-blocks is changed.

23. The non-transitory computer-readable storage medium of claim 21, wherein each data block comprises a plurality of sub-blocks, and the sequence of the sub-blocks is changed.

24. A method of encrypting content data in a network system comprising at least one server and a plurality of user terminals communicating utilizing an overlay multicasting topology via a network, the method comprising:
   receiving, at one of the user terminals, content data comprising a plurality of blocks from a server via the network;
   changing a sequence of the blocks of the received content data, wherein a portion of the changed sequence of the blocks is selected, and the selected portion corresponds to decryption key data;
   generating a decryption key according to the selected portion which corresponds to the changed sequence of the content data; and
   encrypting the decryption key,
   wherein in response to receipt of a signal of a playback request or a transmission request of the sequence-changed content data transmitted from one or more of the user terminals, the encrypted decryption key is decrypted, and the corresponding data is extracted from the memory according to the selected portion of the changed sequence of the blocks to be played back or transmitted.

25. The method of claim 24, wherein the received content data is randomly stored by a block unit.

26. The method of claim 25, wherein the block unit comprises a plurality of sub-blocks, each of the sub-blocks comprises a plurality of stripes, and a sequence of the stripes included in each of the sub-blocks is changed.

27. The method of claim 25, wherein the block unit comprises a plurality of sub-blocks, and a sequence of the sub-blocks is changed.

28. The method of claim 1, wherein the received content data is stored in a cache memory of the user terminal.

29. The apparatus of claim 15, wherein the received content data is stored in a cache memory of the client device.

30. The method of claim 24, wherein the received content data is stored in a cache memory of the user terminal.

* * * * *